(12) United States Patent
Zenzai (10) Patent No.: US 12,469,644 B2
(45) Date of Patent: Nov. 11, 2025

(54) MULTILAYER CERAMIC CAPACITOR AND BUMP-PRODUCING PASTE

(71) Applicant: Murata Manufacturing Co., Ltd., Nagaokakyo (JP)

(72) Inventor: Kota Zenzai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 117 days.

(21) Appl. No.: 18/629,028

(22) Filed: Apr. 8, 2024

(65) Prior Publication Data

US 2024/0258037 A1    Aug. 1, 2024

Related U.S. Application Data

(63) Continuation of application No. PCT/JP2022/041548, filed on Nov. 8, 2022.

(30) Foreign Application Priority Data

Nov. 10, 2021    (JP) .................................. 2021-183734

(51) Int. Cl.
*H01G 4/232*    (2006.01)
*H01G 2/06*     (2006.01)
(Continued)

(52) U.S. Cl.
CPC ........... *H01G 4/2325* (2013.01); *H01G 2/065* (2013.01); *H01G 4/008* (2013.01); *H01G 4/012* (2013.01); *H01G 4/12* (2013.01); *H01G 4/30* (2013.01)

(58) Field of Classification Search
CPC ...... H01G 4/2325; H01G 2/065; H01G 4/008; H01G 4/012; H01G 4/12; H01G 4/30; H01G 4/228; H01G 4/248
(Continued)

(56) References Cited

U.S. PATENT DOCUMENTS 10,566,137 B2    2/2020  Park et al.
2012/0218678 A1*  8/2012  Satou ...................... H01G 4/12
                                              361/303
(Continued)

FOREIGN PATENT DOCUMENTS

JP    2010108845 A    5/2010
JP    2015216337 A    12/2015
(Continued)

OTHER PUBLICATIONS

International Search Report in PCT/JP2022/041548, mailed Feb. 14, 2023, 3 pages.
(Continued)

*Primary Examiner* — Arun Ramaswamy
(74) *Attorney, Agent, or Firm* — Keating & Bennett, LLP (57) ABSTRACT

A multilayer ceramic capacitor includes a multilayer body including dielectric layers and internal electrode layers, outer electrode layers on end surfaces of the multilayer body at opposite ends in a longitudinal direction and covering end surface sides of each of principal surfaces of the multilayer body at opposite ends in a laminating direction and end surface sides of each of side surfaces at opposite ends in a width direction and bumps on the end surface sides of one principal surface of the multilayer body such that the outer electrode layers covering the one principal surface are sandwiched between the bumps and the one principal surface. Each bump includes copper covering an area of about 50% or more and about 96% or less in a cross section through widthwise centers of the bumps and extending in the laminating direction and the longitudinal direction.

20 Claims, 6 Drawing Sheets

(51) Int. Cl.
  *H01G 4/008*    (2006.01)
  *H01G 4/012*    (2006.01)
  *H01G 4/12*     (2006.01)
  *H01G 4/30*     (2006.01)

(58) Field of Classification Search
  USPC ............... 361/301.4, 306.3, 321.1, 321.3
  See application file for complete search history.

(56) References Cited

U.S. PATENT DOCUMENTS

| | | | |
|---|---|---|---|
| 2015/0124370 A1* | 5/2015 | Ahn | ............... H01G 4/12 |
| | | | 361/272 |
| 2019/0080845 A1 | 3/2019 | Onodera et al. | |
| 2019/0287719 A1 | 9/2019 | Fujita et al. | |
| 2020/0343048 A1 | 10/2020 | Yokomizo | |
| 2021/0035742 A1 | 2/2021 | Hattori | |

FOREIGN PATENT DOCUMENTS

| | | | | |
|---|---|---|---|---|
| JP | 2019050278 A | 3/2019 | | |
| JP | 2020181962 A | 11/2020 | | |
| JP | 2021027054 A | 2/2021 | | |
| WO | 2018101405 A1 | 6/2018 | | |
| WO | WO-2020040138 A1 * | 2/2020 | ............... | H05K 1/09 |

OTHER PUBLICATIONS

Written Opinion in PCT/JP2022/041548, mailed Feb. 14, 2023, 4 pages.

* cited by examiner

MULTILAYER CERAMIC CAPACITOR AND BUMP-PRODUCING PASTE

CROSS REFERENCE TO RELATED APPLICATIONS

This application claims the benefit of priority to Japanese Patent Application No. 2021-183734 filed on Nov. 10, 2021 and is a Continuation Application of PCT Application No. PCT/JP2022/041548 filed on Nov. 8, 2022. The entire contents of each application are hereby incorporated herein by reference.

BACKGROUND OF THE INVENTION

1. Field of the Invention

The present invention relates to multilayer ceramic capacitors and bump-producing pastes.

2. Description of the Related Art

A multilayer ceramic capacitor includes an inner layer portion including dielectric layers and internal electrodes alternately laminated on one another. Dielectric layers serving as outer layer portions are disposed on upper and lower portions of the inner layer portion, and a rectangular parallelepiped multilayer body is thereby formed. Outer electrodes are provided on longitudinally opposite end surfaces of the multilayer body, and a capacitor main body is thereby formed.

One known multilayer ceramic capacitor proposed to reduce the occurrence of so-called "acoustic noise" includes bumps that are formed on a mounting side of a capacitor main body to be mounted on a substrate so as to cover a portion of outer electrodes (see Japanese Unexamined Patent Application Publication No. 2015-216337).

SUMMARY OF THE INVENTION

However, in the conventional product, the adhesive strength between the capacitor main body and the bumps is low, and the bumps are separated from the capacitor main body in some cases.

Example embodiments of the present invention provide multilayer ceramic capacitors and bump-producing pastes that increase an adhesive strength between a capacitor main body and bumps.

A multilayer ceramic capacitor according to an example embodiment of the present invention includes a multilayer body including dielectric layers and internal electrode layers alternately laminated one on another, outer electrode layers on respective two end surfaces of the multilayer body, the two end surfaces being at opposite ends with respect to a longitudinal direction intersecting a laminating direction, the outer electrode layers covering respective two end surface sides of each of two principal surfaces of the multilayer body, the two principal surfaces being at opposite ends with respect to the laminating direction, the outer electrode layers further covering respective two end surface sides of each of two side surfaces of the multilayer body, the two side surfaces being at opposite ends with respect to a width direction intersecting the laminating direction and the longitudinal direction, the outer electrode layers being connected to the internal electrode layers, and bumps located on the respective two end surface sides of one of the two principal surfaces of the multilayer body such that the outer electrode layers covering the one of the two principal surfaces are sandwiched between the respective bumps and the one of the two principal surfaces, in which each of the bumps includes copper that occupies an area of about 50% or more and about 96% or less in a cross section passing through centers, with respect to the width direction, of the bumps and extending in the laminating direction and the longitudinal direction.

A bump-producing paste for a multilayer ceramic capacitor according to an example embodiment of the present invention includes a copper powder, an epoxy resin, and a solvent, in which the bump-producing paste does not include a curing agent.

Example embodiments of the present invention provide multilayer ceramic capacitors and bump-producing pastes that increase the adhesive strength between the capacitor main body and the bumps.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
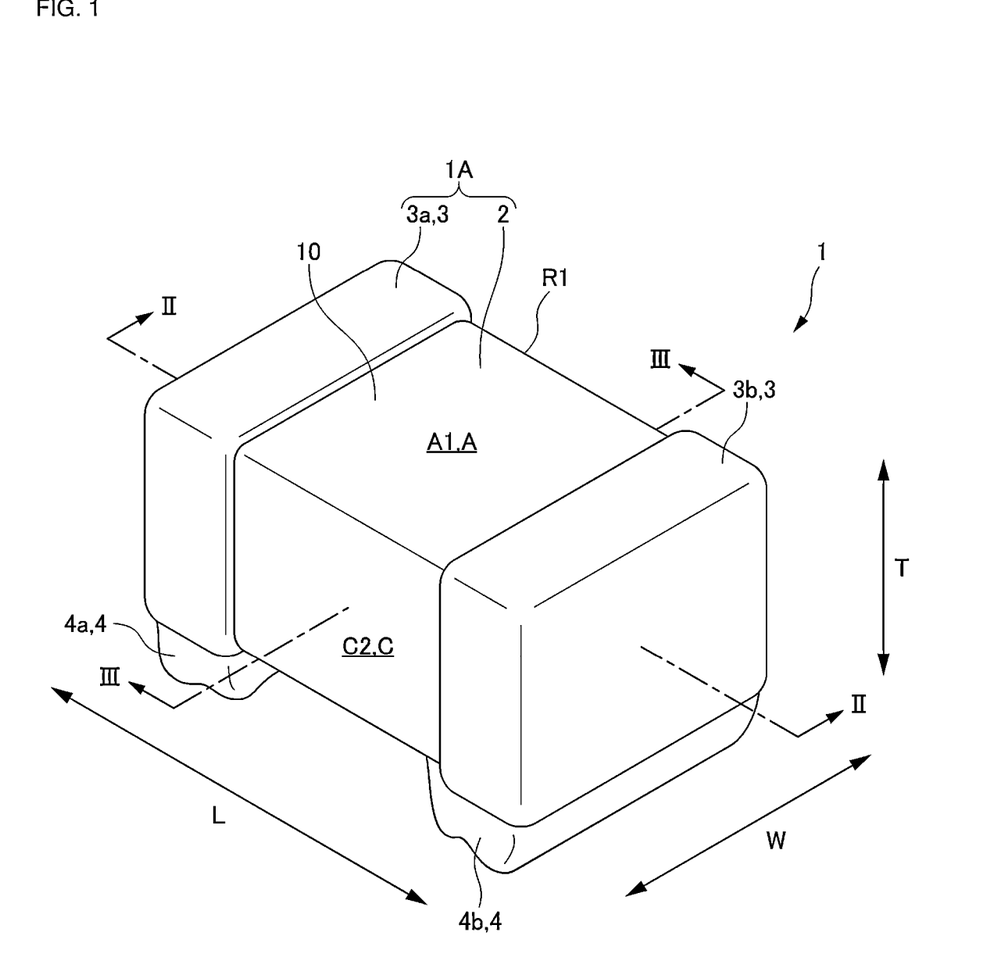
FIG. 1 is a schematic perspective view of a multilayer ceramic capacitor 1 in an example embodiment of the present invention.
Figure 2:
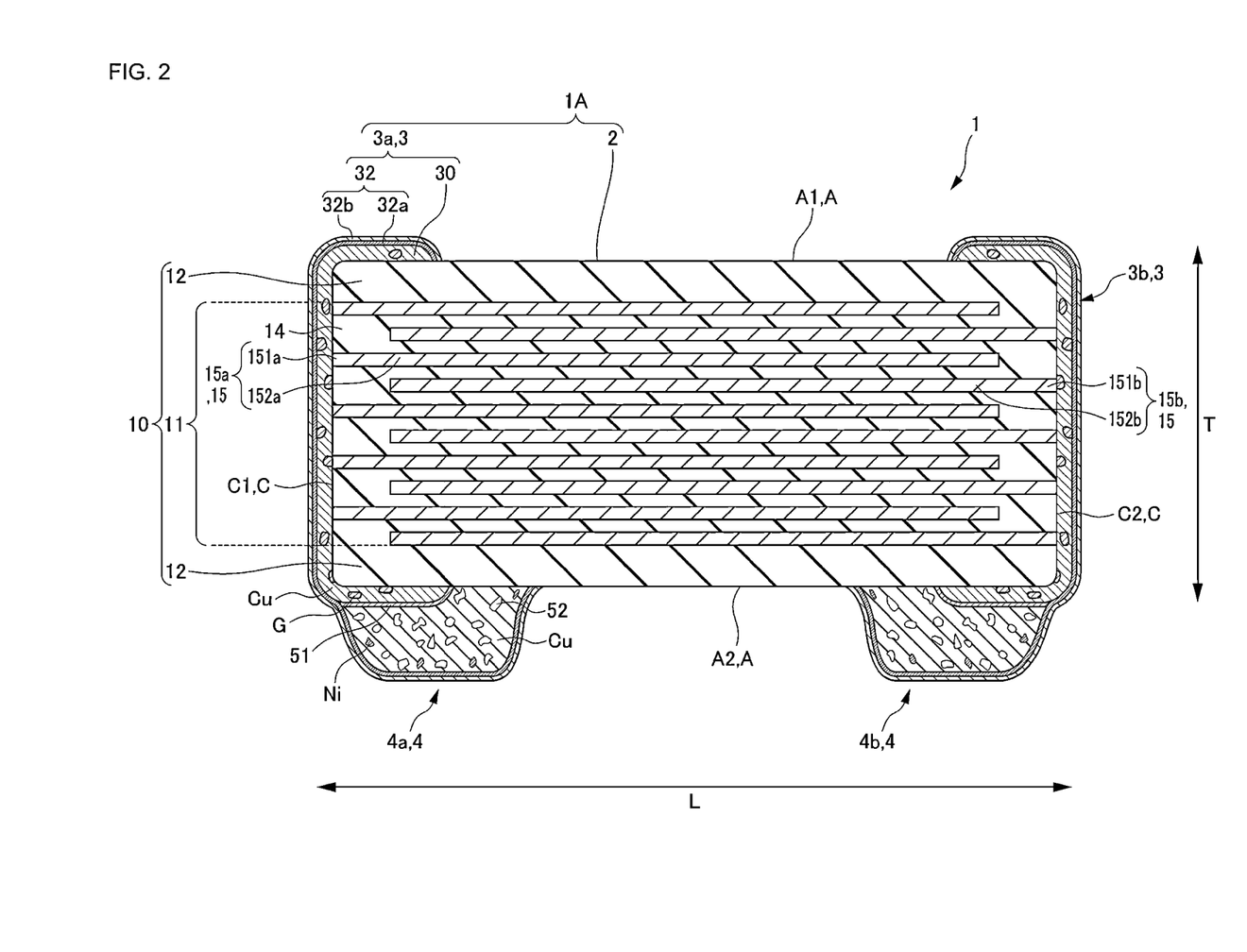
FIG. 2 is a cross-sectional view showing the multilayer ceramic capacitor 1 in the present example embodiment of the present invention of FIG. 1 and taken along line II-II in FIG. 1.
Figure 3:
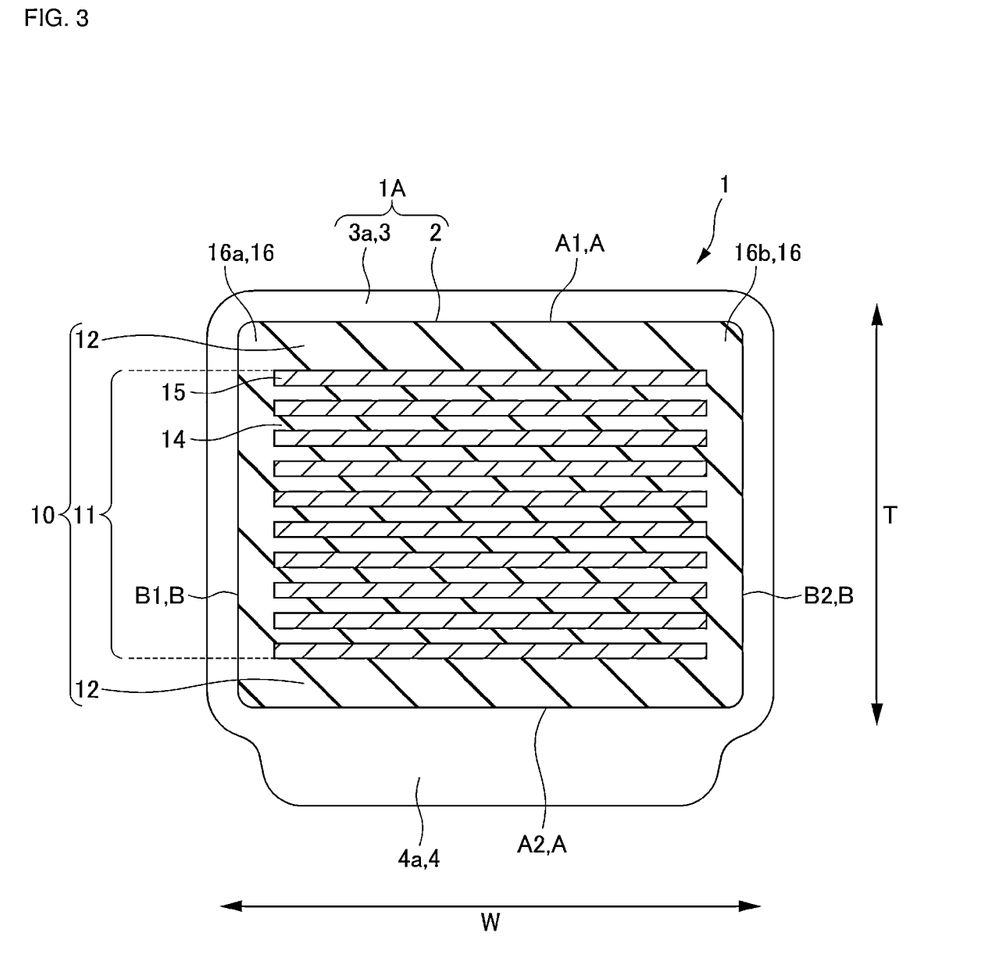
FIG. 3 is a cross-sectional view showing the multilayer ceramic capacitor 1 in the present example embodiment of the present invention of FIG. 1 and taken along line III-III in FIG. 1.

A multilayer ceramic capacitor 1 according to an example embodiment of the present invention will be described. FIG. 1 is a schematic perspective view of the multilayer ceramic capacitor 1 in the present example embodiment. FIG. 2 is a cross-sectional view showing the multilayer ceramic capacitor 1 in the present example embodiment and taken along line II-II in FIG. 1. FIG. 3 is a cross-sectional view showing the multilayer ceramic capacitor 1 in the present example embodiment and taken along line III-III in FIG. 1.

The multilayer ceramic capacitor 1 has a substantially rectangular parallelepiped shape and includes a capacitor main body 1A including a multilayer body 2 and a pair of outer electrode layers 3 disposed at opposite ends of the multilayer body 2, and bumps 4 attached to the capacitor main body 1A. The multilayer body 2 includes an inner layer portion 11 including a plurality of pairs of a dielectric layer 14 and an internal electrode layer 15.

In the following description, as for the terms representing the orientation of the multilayer ceramic capacitor 1, the direction in which the pair of outer electrode layers 3 are arranged in the multilayer ceramic capacitor 1 is defined as a longitudinal direction L. The direction in which the dielectric layers 14 and the internal electrode layers 15 are laminated is defined as a laminating direction T. A direction intersecting both the longitudinal direction L and the laminating direction T is defined as a width direction W. In the present example embodiment, the width direction W is orthogonal to both the longitudinal direction L and the laminating direction T.

FIG. 2 shows a cross section that passes through the center, with respect to the width direction W, of the multilayer ceramic capacitor 1 and extends in the longitudinal direction L and the laminating direction T.

Outer Surfaces of Multilayer Body 2

Among the six outer surfaces of the multilayer body 2, a pair of outer surfaces opposed to each other in the laminating direction T are defined as a first principal surface A1 and a second principal surface A2, and a pair of outer surfaces opposed to each other in the width direction W are defined as a first side surface B1 and a second side surface B2. A pair of outer surfaces opposed to each other in the longitudinal direction L are defined as a first end surface C1 and a second end surface C2. In the following description, when it is not particularly necessary to distinguish the first principal surface A1 and the second principal surface A2 from each other, they are collectively referred to as principal surfaces A. When it is not particularly necessary to distinguish the first side surface B1 and the second side surface B2 from each other, they are collectively referred to as side surfaces B. When it is not particularly necessary to distinguish the first end surface C1 and the second end surface C2 from each other, they are collectively referred to as end surfaces C.

Preferably, ridge portions R1 of the multilayer body 2 each having an edge portion are rounded. Each ridge portion R1 is a portion at which two surfaces of the multilayer body 2, i.e., a principal surface A and a side surface B, a principal surface A and an end surface C, or a side surface B and an end surface C, intersect each other.

Multilayer Body 2

The multilayer body 2 includes a multilayer main body 10 including the inner layer portion 11 and outer layer portions 12 disposed on opposite sides of the inner layer portion 11 with respect to the laminating direction T, and side gap portions 16 disposed on opposite sides of the multilayer main body 10 with respect to the width direction W.

Inner Layer Portion 11

The inner layer portion 11 includes a plurality of pairs of a dielectric layer 14 and an internal electrode layer 15, the dielectric layers 14 and the internal electrode layers 15 being alternately laminated in the laminating direction T.

The dielectric layers 14 are produced using a ceramic material. The ceramic material used is, for example, a dielectric ceramic including $BaTiO_3$ as a main component.

The internal electrode layers 15 include a plurality of first internal electrode layers 15a and a plurality of second internal electrode layers 15b. The first internal electrode layers 15a and the second internal electrode layers 15b are arranged alternately. Each of the first internal electrode layers 15a includes a first facing portion 152a that faces second internal electrode layers 15b and a first extending portion 151a extending from the first facing portion 152a toward the first end surface C1. An end portion of the first extending portion 151a is exposed at the first end surface C1 and electrically connected to a first outer electrode layer 3a described later. Each of the second internal electrode layers 15b includes a second facing portion 152b facing first internal electrode layers 15a and a second extending portion 151b extending from the second facing portion 152b toward the second end surface C2. An end portion of the second extending portion 151b is electrically connected to a second outer electrode layer 3b described later. Electric charges are accumulated in the first facing portion 152a of each first internal electrode layer 15a and the second facing portion 152b of each second internal electrode layer 15b.

Preferably, the internal electrode layers 15 are formed of, for example, a metal material typified by nickel (Ni), copper (Cu), silver (Ag), palladium (Pd), a silver-palladium (Ag—Pd) alloy, gold (Au), etc.

Outer Layer Portions 12

The outer layer portions 12 are formed of the same material as the material of the dielectric layers 14 in the inner layer portion 11.

Side Gap Portions 16

The side gap portions 16 include a first side gap portion 16a disposed on the side surface B side of the multilayer main body 10 and a second side gap portion 16b disposed on the second side surface B2 side of the multilayer main body 10. The side gap portions 16 are formed of the same material as the material of the dielectric layers 14.

Outer Electrode Layers 3

The outer electrode layers 3 include a first outer electrode layer 3a disposed on the first end surface C1 and a second outer electrode layer 3b disposed on the second end surface C2. The outer electrode layers 3 cover not only the end surfaces C but also end surface C-side portions of the principal surfaces A and end surface C-side portions of the side surfaces B.

As described above, the end portion of the first extending portion 151a of each first internal electrode layer 15a is exposed at the first end surface C1 and electrically connected to the first outer electrode layer 3a. The end portion of the second extending portion 151b of each second internal electrode layer 15b is exposed at the second end surface C2 and electrically connected to the second outer electrode layer 3b. In this case, a structure in which a plurality of capacitor elements are electrically connected in parallel is provided between the first outer electrode layer 3a and the second outer electrode layer 3b.

Each of the outer electrode layers 3 includes a base electrode layer 30 and a plating layer 32.

The base electrode layer 30 includes, for example, an electrically conductive metal and glass G. In the present example embodiment, the electrically conductive metal used for the base electrode layer 30 is copper Cu.

The plating layer 32 includes a nickel plating layer 32a disposed on the outer circumferential surface of the base electrode layer 30 and a tin plating layer 32b disposed on the outer circumferential surface of the nickel plating layer 32a. Note that, in a portion in which a bump 4 described next is disposed, the plating layer 32 is disposed on the outer circumferential surface of the bump 4.

Bumps 4

The bumps 4 include a pair of a first bump 4a and a second bump 4b. The first bump 4a is disposed on the second principal surface A2 side, which is a substrate mount surface side, of the capacitor main body 1A and located on the end surface C1 side with respect to the longitudinal direction L, and the second bump 4b is disposed on the second principal surface A2 side and located on the end surface C2 side. As shown in FIG. 2, the first bump 4a and the second bump 4b are disposed at positions substantially line-symmetric with respect to a center line passing through the center with respect to the longitudinal direction L and extending in the width direction W and are spaced apart from each other by a prescribed distance in the longitudinal direction L.

Each of the bumps 4 is disposed outside the capacitor main body 1A such that the base electrode layer 30 of the corresponding outer electrode layer 3 that extends to the second principal surface A2 is sandwiched between the bump 4 and the capacitor main body 1A. Each bump 4 includes not only a portion on the base electrode layer 30 that extends along the second principal surface A2 but also a portion in direct contact with a corresponding one of the outer layer portions 12 of the multilayer body 2.

Each of the bumps 4 includes copper Cu serving as a base metal and includes voids 52 present inside the copper Cu. In a cross section passing through the centers, with respect to the width direction W, of the bumps shown in FIG. 2 and extending in the laminating direction T and the longitudinal direction L, the copper Cu occupies an area of about 50% or more and about 96% or less, for example. This area is computed as follows. The cross section is exposed, and an image of the cross section is captured and binarized. Then the ratio of the area of the copper Cu to the total area is computed. The copper Cu is identified by any of various methods such as WDX and EDX.

In the present example embodiment, each bump 4 does not contain glass G. The bump 4 may contain a trace amount of glass G. However, even in this case, the amount of glass included in the bump 4 is very small with respect to the amount of the base electrode layer 30.

Although not illustrated, the outer surface of each bump 4 is a rough surface with copper Cu particles not fully melted. Nickel Ni is included in a region within about 10 μm from the surface of the bump 4, for example. The nickel Ni may be present in an inner region more than about 10 μm from the surface of the bump.

Method for Producing Multilayer Ceramic Capacitor 1

Figure 4:
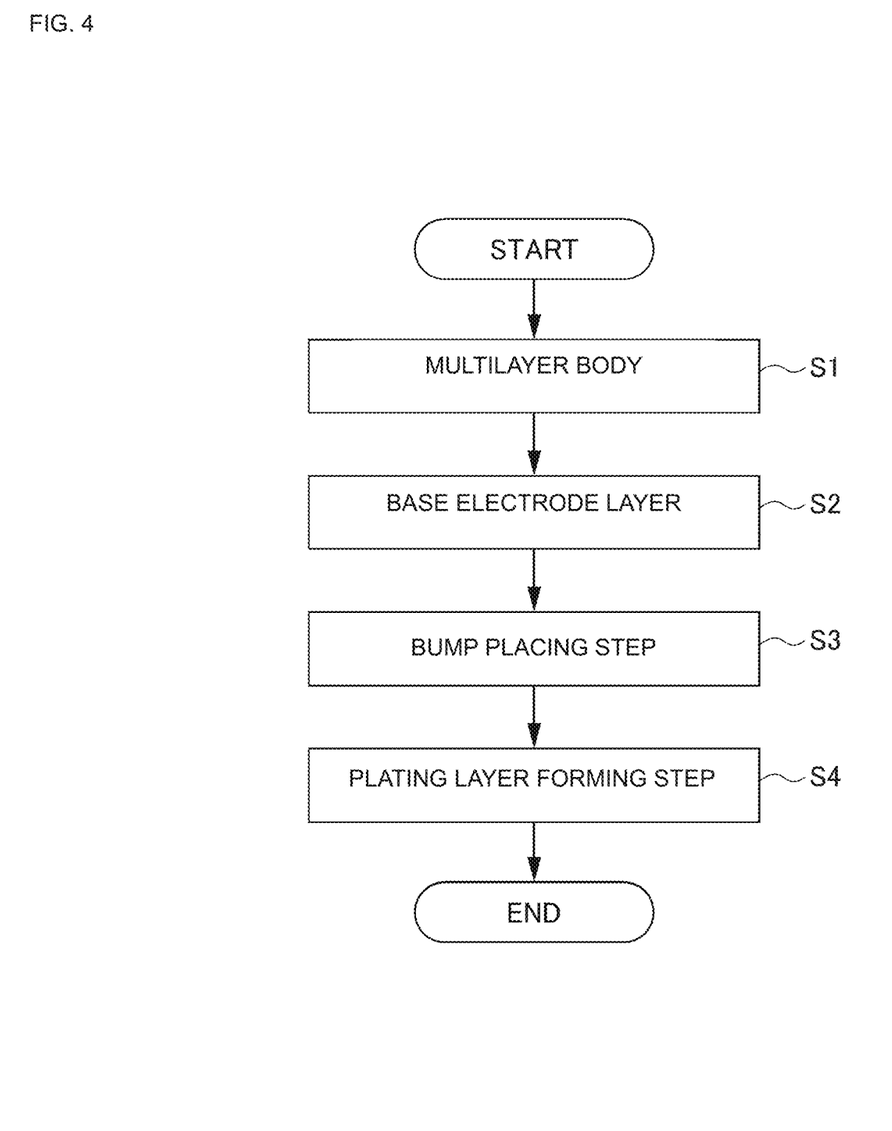
FIG. 4 is a flowchart describing a method for producing the multilayer ceramic capacitor 1.

FIG. 4 is a flowchart showing a method for producing the multilayer ceramic capacitor 1. The method for producing the multilayer ceramic capacitor 1 includes a multilayer body producing step S1, a base electrode layer forming step S2, a bump placing step S3, and a plating layer forming step S4. FIGS. 5A to 5D are illustrations for describing the multilayer body producing step S1 and the base electrode layer forming step S2. FIGS. 6A to 6D are illustrations for describing the bump placing step S3 and the plating layer forming step S4.

Multilayer Body Producing Step S1

A ceramic slurry including a ceramic powder, a binder, and a solvent is formed into a sheet on the outer circumferential surface of a carrier film using a die coater, a gravure coater, a micro-gravure coater, etc. Ceramic green sheets 101 for lamination that later become the dielectric layers 14 are produced in the manner described above. Next, an electrically conductive paste is applied in a strip shape to each ceramic green sheet 101 for lamination by screen printing, inkjet printing, gravure printing, etc. An electrically conductive pattern 102 that later becomes an internal electrode layer 15 is thereby formed by printing on the surface of the ceramic green sheet 101 for lamination, and a material sheet 103 with the electrically conductive pattern 102 formed thereon is produced.

Figure 5A:
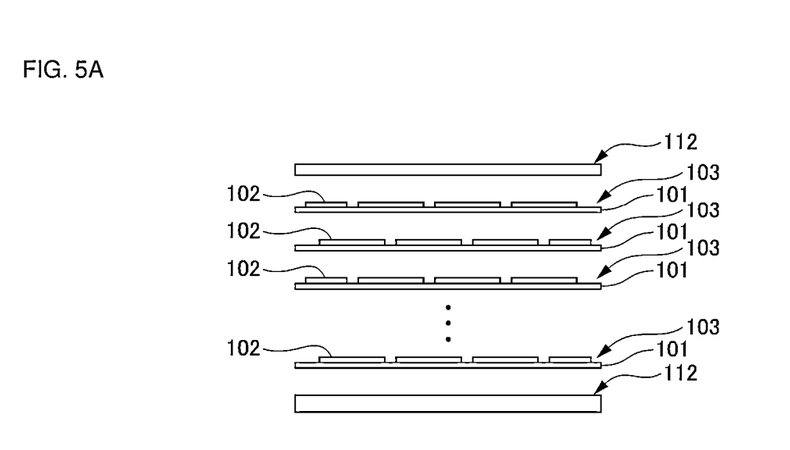
FIGS. 5A to 5D are illustrations for describing a multilayer body producing step S1 and a base electrode layer forming step S2.

Next, as shown in FIG. 5A, a plurality of the material sheets 103 are stacked such that the electrically conductive patterns 102 are oriented in the same direction and that the electrically conductive patterns 102 of adjacent material sheets 103 are mutually displaced by half a pitch in the width direction. Then ceramic green sheets 112 for outer layer portions that later become the outer layer portions 12 are stacked on opposite sides of the plurality of stacked material sheets 103.

Figure 5B:
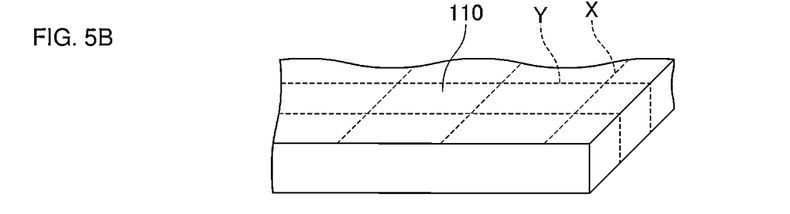

The plurality of material sheets 103 and the ceramic green sheets 112 for the outer layer portions that are stacked together are thermocompression-bonded to produce a mother block 110 shown in FIG. 5B.

Figure 5C:
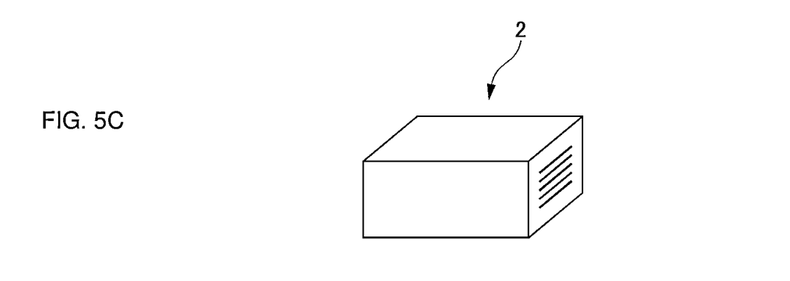

Next, the mother block 110 is cut along cutting lines X shown in FIG. 5B and cutting lines Y intersecting the cutting lines X to produce a plurality of multilayer bodies 2 shown in FIG. 5C.

Base Electrode Layer Forming Step S2

Figure 5D:
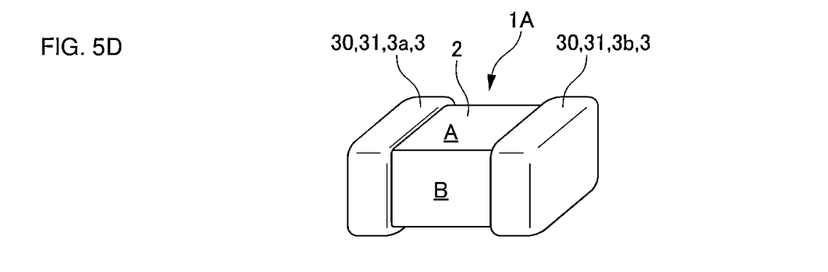

Next, an electrically conductive paste including copper Cu, which is an electrically conductive metal, and the glass G is applied to the end surfaces C of each multilayer body 2 and then baked to form the base electrode layers 30. The base electrode layers 30 are formed so as to not only cover the end surfaces C on opposite sides of the multilayer body 2 but also extend to the principal surface A sides and the side surface B sides of the multilayer body 2 to thereby cover a portion of the end surface C sides of the principal surfaces A.

Bump Placing Step S3

A bump-producing paste 44 used to produce bumps is prepared. The bump-producing paste is an electrically conductive paste.

The bump-producing paste 44 includes a copper Cu powder, an epoxy resin, and a solvent. The bump-producing paste 44 does not contain a curing agent such as a phenolic resin or imidazole.

The volume ratio of copper to the epoxy resin is about 70% or more and about 90% or less, for example. The epoxy resin is a bisphenol A-type epoxy resin.

The electrically conductive paste Cu includes a copper Cu powder having a median diameter d50 of about 5 μm or more and about 10 μm or less and a copper Cu powder having a median diameter d50 of about 0.5 μm or more and about 1.5 μm or less, with the volume ratio of the former to the latter being about 55% or more and about 95% or less, for example.

The solvent is, for example, diethylene glycol monobutyl ether, diethylene glycol monoethyl ether, or diethylene glycol monomethyl ether.

Figure 6A:
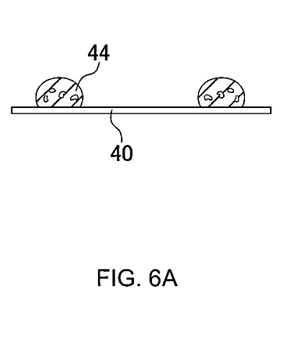
FIGS. 6A to 6D are illustrations for describing a bump placing step S3 and a plating layer forming step S4.
Figure 6B:
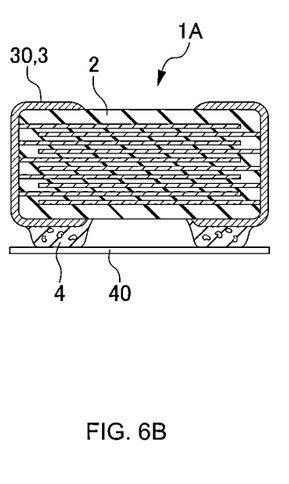

To form the bumps 4, for example, a holding substrate 40 shown in FIGS. 6A to 6D is used. As shown in FIG. 6A, the bump-producing paste 44 is placed on the holding substrate 40 using a screen printing method or a dispensing method. Preferably, the holding substrate 40 can withstand the baking temperature of Cu. Next, as shown in FIG. 6B, the capacitor main body 1A is mounted on the outer circumferential surface of the holding substrate 40 such that the second principal surface A2 side faces the holding substrate 40. In this case, the positions of the outer electrode layers 3 of the capacitor main body 1A and the position of the bump-producing paste 44 are adjusted, and the bump-producing paste 44 adheres to the capacitor main body 1A.

With this state maintained, a heating step of performing heating at a temperature for baking the copper Cu is performed. In this manner, the metal in the paste forms an intermetallic compound, and the paste is cured, so that bumps 4 joined to the capacitor main body 1A and to the outer electrode layers 3 are formed. When a plurality of metals are included, an alloy may be formed in the sintered body. The plurality of metals are, for example, copper Cu and nickel Ni.

Figures 6C, 6D:
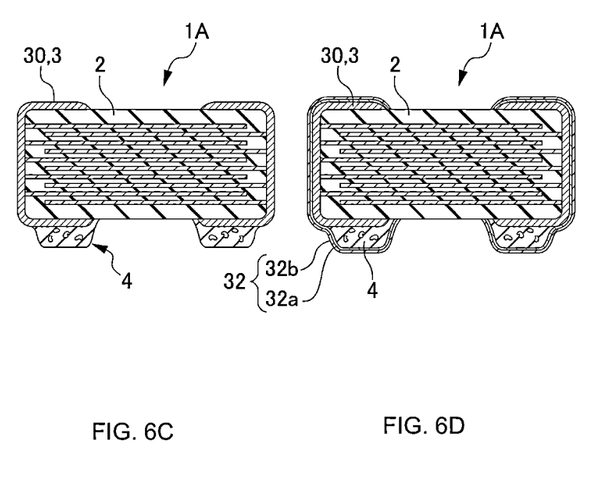

Then the capacitor main body 1A together with the bumps 4 is separated from the holding substrate 40, and the state in FIG. 6C is obtained.

Plating Layer Forming Step S4

Next, the nickel plating layer 32a is formed on the outer circumferential surfaces of the bumps 4 and on portions of the capacitor main body 1A at which the base electrode layer 30 is exposed, and then the tin plating layer 32b is formed on the outer circumferential surface of the nickel plating layer 32a. Through the steps described above, the multilayer ceramic capacitor 1 is produced.

Effects of Current Example Embodiment

The bumps 4 include copper Cu. In a cross section passing through the centers, with respect to the width direction W, of the bumps 4 and extending in the laminating direction T and the longitudinal direction L, the copper Cu occupies an area of about 50% or more and about 96% or less, for example. Each of the outer electrode layers 3 includes the base electrode layer 30 including copper Cu and the glass G. The base electrode layer 30 and the bumps 4 are formed by sintering the respective electrically conductive pastes each including copper Cu. Therefore, the bonding between the base electrode layer 30 and the bumps 4 is strong, and the adhesive strength is improved.

The nickel plating 32a is disposed on the outer circumferential surfaces of the outer electrode layers 3 and the bumps 4, and the tin plating 32b is disposed on the outer circumferential surface of the nickel plating 32. Therefore, the multilayer ceramic capacitor 1 can be firmly attached to a mounting substrate using solder.

The bump-producing paste 44 includes the copper Cu powder, the epoxy resin, and the solvent and does not contain a curing agent such as a phenolic resin or imidazole. Since the bump-producing paste 44 includes no curing agent, the bonding between copper Cu powder particles can be increased. Therefore, the strength of the bumps 4 is improved.

In the bump-producing paste 44, the volume ratio of the copper Cu to the epoxy resin is about 70% or more and about 90% or less, for example. Since the volume ratio of the copper Cu is large, good electric conductivity is obtained.

Modifications

The above-described example embodiments of the present invention has been described. However, the present invention is not limited to the above-described example embodiments, and various modifications can be made within the scope of the present invention.

For example, it is unnecessary that the metal included in the base electrode layer 30 be copper Cu. For example, the base electrode layer 30 may be formed by sintering an electrically conductive paste including a metal such as nickel Ni. When the metal included in the outer electrode layers 3 is nickel Ni, the Ni included in the base electrode layer 30 and the Cu included in the bumps 4 are alloyed to form a sintered portion 51.

Even if the sintered portion 51 is not formed, when the base electrode layer 30 and the bumps 4 are formed by sintering respective electrically conductive pastes each including a metal, the bonding between the base electrode layer 30 and the bumps 4 is strong, and the adhesive strength is improved.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including dielectric layers and internal electrode layers alternately laminated one on another;
    outer electrode layers on respective two end surfaces of the multilayer body, the two end surfaces being at opposite ends with respect to a longitudinal direction intersecting a laminating direction, the outer electrode layers covering respective two end surface sides of each of two principal surfaces of the multilayer body, the two principal surfaces being at opposite ends with respect to the laminating direction, the outer electrode layers further covering respective two end surface sides of each of two side surfaces of the multilayer body, the two side surfaces being at opposite ends with respect to a width direction intersecting the laminating direction and the longitudinal direction, the outer electrode layers being connected to the internal electrode layers; and
    bumps located on the respective two end surface sides of one of the two principal surfaces of the multilayer body such that the outer electrode layers covering the one of the two principal surfaces are sandwiched between the respective bumps and the one of the two principal surfaces; wherein
    each of the bumps includes copper that occupies an area of about 50% or more and about 96% or less in a cross section passing through centers, with respect to the width direction, of the bumps and extending in the laminating direction and the longitudinal direction.

2. The multilayer ceramic capacitor according to claim 1, wherein, in each of the bumps, nickel is included in a region within about 10 μm from a surface of the each of the bumps.

3. The multilayer ceramic capacitor according to claim 1, wherein
    each of the outer electrode layers includes a base electrode layer including copper and glass; and
    the base electrode layer and the copper included in the bumps are electrically continuous.

4. The multilayer ceramic capacitor according to claim 3, wherein, in each of the bumps, a content of the glass is less than that in the base electrode layer.

5. The multilayer ceramic capacitor according to claim 1, wherein
    nickel plating is located on outer circumferential surfaces of the outer electrode layers and outer circumferential surfaces of the bumps; and
    tin plating is located on an outer circumferential surface of the nickel plating.

6. The multilayer ceramic capacitor according to claim 1, wherein each of the bumps includes a portion directly attached to the multilayer body.

7. The multilayer ceramic capacitor according to claim 1, wherein the multilayer body has a rectangular or substantially rectangular parallelepiped shape.

8. The multilayer ceramic capacitor according to claim 1, wherein the multilayer body includes ridge portions defined by rounded edge portions.

9. The multilayer ceramic capacitor according to claim 1, wherein the multilayer body includes side gap portions on opposite sides with respect to the width direction.

10. The multilayer ceramic capacitor according to claim 1, wherein each of the bumps includes voids.

11. The multilayer ceramic capacitor according to claim 1, wherein some of the bumps include glass and some of the bumps do not include glass.

12. The multilayer ceramic capacitor according to claim 1, wherein an outer surface of each of the bumps includes a rough surface with copper particles that are not fully melted.

13. The multilayer ceramic capacitor according to claim 1, wherein the bumps do not include a curing agent.

14. The multilayer ceramic capacitor according to claim 1, wherein the bumps do not include phenolic resin or imidazole.

15. A bump-producing paste for the multilayer ceramic capacitor according to claim 1, the bump-producing paste comprising:
- a copper powder;
- an epoxy resin; and
- a solvent; wherein
- the bump-producing paste does not include a curing agent.

16. The bump-producing paste according to claim 15, wherein the bump-producing paste does not include phenolic resin or imidazole.

17. The bump-producing paste according to claim 15, wherein a volume ratio of the copper to the epoxy resin is about 70% or more and about 90% or less.

18. The bump-producing paste according to claim 15, wherein the epoxy resin is a bisphenol A-type epoxy resin.

19. The bump-producing paste according to claim 15, wherein the copper powder includes a copper powder with a median diameter d50 of about 5 µm or more and about 10 µm or less and a copper powder with a median diameter d50 of about 0.5 µm or more and about 1.5 µm or less, wherein a volume ratio of the copper powder with a median diameter d50 of about 5 µm or more and about 10 µm or less to the copper powder with a median diameter d50 of about 0.5 µm or more and about 1.5 µm or less is about 55% or more and about 95% or less.

20. The bump-producing paste according to claim 15, wherein the solvent is diethylene glycol monobutyl ether or diethylene glycol monoethyl ether.

\* \* \* \* \*